Patented May 28, 1946

2,401,055

UNITED STATES PATENT OFFICE 2,401,055

COMPOSITION OF MATTER AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Application June 21, 1943, Serial No. 491,734

8 Claims. (Cl. 260—406)

This invention relates to a new chemical product or compound, and to the manufacture and use of the same, our present application being a continuation-in-part of our pending application Serial No. 467,476, filed November 30, 1942.

One object of our invention is to provide a new oxyalkylated derivative of blown dehydrated ricinoleic acid compounds.

Another object of our invention is to provide a practical method of making the same compounds or chemical products.

Although one of the primary objects of our invention is to provide a new compound or composition of matter that is an efficient demulsifier for crude oil emulsions of the water-in-oil type, said composition is adapted for use in other arts, as hereinafter indicated. Such compounds or products may also have additional uses in various other fields which as yet have not been investigated.

The oxyalkylated derivatives of blown dehydrated ricinoleic acid compounds herein described, are of value in connection with such processes as the flooding of subterranean oil-bearing sands; the prevention of oil-in-water emulsions in the acidization of calcareous oil-bearing strata; as a break inducer in the doctor treatment of sour hydrocarbon distillates or the like, etc.

Oxyalkylation is concerned with procedure whereby compounds are subjected to reaction with a reactant having a reactive ethylene oxide ring. The most suitable oxyalkylating agents are ethylene oxide, propylene oxide, butylene oxide, glycidol, etc. However, there are other well known oxyalkylating agents. For instance, U. S. Patent No. 2,208,581, dated July 23, 1940, to Hoeffelmann enumerates the following: glycerine epichlorhydrin, glycide alcohol, ethylene oxide, propylene oxide, butene-2-oxide, butene-1-oxide, isobutylene oxide, butadiene oxide, butadiene dioxide, chloroprene oxide, isoprene oxide, decene oxide, styrene oxide, cyclohexylene oxide, cyclopentene oxide, etc.

Oxyalkylation, and particularly oxyethylation, is apt to involve any labile hydrogen atom, as, for example, a hydrogen atom attached to an oxygen atom. Other reactions involving ethylene oxide or the like are those in which ester rearrangement or interchange takes place. In other instances, aldehydic or ketonic carbonyl radicals may be effective. In a general way, oxyalkylation, and particularly oxyethylation, takes place at moderate temperatures, for instance, 150–200° C., under moderate pressures, for instance, not over 450 lbs. gauge pressure. Such reactions may be accelerated by means of a catalyst, such as a small amount of alkali, as, for instance, one-fourth percent of sodium methylate. Such reactions are conducted with constant stirring so as to promote contact with the ethylene oxide or other oxyalkylating agent. Generally speaking, the reaction or series of reactions are conducted in a stepwise manner, i. e., if one intended to introduce 10–20 moles of ethylene oxide per mole of glyceride or its equivalent, one might introduce 2 moles of ethylene oxide at a time until approximately one-half the ethylene oxide had been introduced, and thereafter, the proportion may be increased until the total amount is introduced. The completeness of reaction is generally indicated by the disappearance of pressure, due to the presence of unreacted ethylene oxide, or the like. Since such procedure, i. e., the oxyalkylation of a glyceride is well known, further description will be avoided, for the simple reason that the oxyalkylation of blown dehydrated castor oil takes place by the same procedure, except that the conditions for oxyalkylation are somewhat more vigorous, i. e., it is more difficult to initiate and continue the reactions. More details as to the conditions of the reaction will be found subsequently in regard to individual examples.

The expression "ricinoleic acid compounds" is intended to refer to ricinoleic acid, polyricinoleic acid, and particularly the glycerides of ricinoleic acid. Specifically, the expression includes monoricinolein, diricinolein, ricinoleic acid, etc. Castor oil of commerce contains approximately 85–90% of triricinolein, and due to its availability and low cost, is the preferred raw material employed in manufacturing the compounds herein described.

It is well known that ricinoleic compounds which have not been subjected to pyrolytic dehydration, may be oxidized in various manners. This is usually accompanied by subjecting a ricinoleic compound to treatment, such as blowing with a suitable gaseous oxidizing medium, e. g., air, oxygen, ozone, or ozonized air. Such oxidation is commonly carried out at ordinary or superatmospheric pressure (up to about 200 lbs. per square inch) either moist or dry; and in the presence or absence of a catalyst, such as lead oleate, cobalt linoleate, or manganese oleate, or such as, alphapinene or linseed oil, etc. Care should be taken, however, not to permit temperature rise such that excessive pyrolytic decomposition would take place. The oxidation may be vigorous as by vigorous blowing, or may be more gradual as by exposure in thin films to air, provided the oxidation is sufficiently prolonged to obtain the desired drastic oxidation. Usually, the time required is at least about 8 to 10 hours, under conditions most favorable to oxidation, e. g., blowing at a relatively high temperature, and for certain fatty compounds much more prolonged oxidation, e. g., several days, or even weeks, is desirable, especially under conditions less favorable to rapid oxidation. In any event, whether the oxidation is produced by continued mild oxidation, or by more vigorous oxidation, a condition of drastic oxidation is indicated by changes in chemical and physical attributes of the material. These changes are usually indicated by a lowered iodine value, an increased saponification value, usually an increased acetyl value, an increased specific gravity, and an increased refractive index. Thus, the iodine number may become less than 70, and even as low as about 40. The saponification value may be about 215 to about 283, and the acetyl value may be about 160 to about 200. The viscosity is increased and the drastically-oxidized product may become very heavy and stiff at ordinary temperatures. The refractive index is also increased. The color of the drastically-oxidized material may be a pale yellow or light amber, or may be a deep orange color. If oxidation is carried on long enough, a product of liver-like consistency and dark color is obtained, but since such material is more difficult to utilize, those drastically-oxidized ricinoleic compounds which are pale blown and have some fluidity at normal temperatures are preferred.

The same sort of procedure which is used to oxidize ricinoleic acid compounds which have not been subjected to pyrolytic dehydration, such as ordinary castor oil of commerce, may also be employed to oxidize dehydrated castor oil, or similar material of the kind herein intended as a primary raw material. Generally speaking, however, the following modifications should be kept in mind:

Such materials are apt to contain at least a significant amount of octadecadiene 9,11-acid-1 or its ester, which is recognized as a powerful catalyst for promoting oxidation of castor oil or similar materials. Thus, it is rarely necessary to add any catalyst to hasten oxidation. Furthermore, it is rarely necessary to oxidize under pressure, although such procedure may be employed. It is rarely necessary to use oxygen instead of air. It is rarely necessary to oxidize at a temperature above 120° C. Thus, notwithstanding the fact that any of the usual procedures employed for oxidizing castor oil may be employed for oxidizing dehydrated castor oil, yet generally speaking, considerably less drastic conditions are required. Furthermore, the time element can be decreased greatly. The same sort of apparatus and the same sort of procedure are employed as in the case of conventional oxidation of castor oil. Since dehydrated castor oil is already polymerized to a greater or lesser degree, and perhaps has initial viscosity considerably greater than that of castor oil, it is obvious that the final stages of oxidation must be carried out more cautiously, and that excessive oxidation may produce a solid or spongy or rubber-like material without previous indication of the imminent critical stage. In any event, the material prior to oxidation should be analyzed and oxidation should be conducted until there is a significant change, as indicated by increase in viscosity, change in such indices as iodine number, hydroxyl number, etc., all of which is obvious to those skilled in the art. As a matter of fact, unless one desires to do so, there is no need to oxidize such dehydrated castor oil, insofar that various products of this kind are sold commercially and used in other arts which have no particular connection with the usage herein contemplated.

Castor oil, or similar materials of the kind described, have been dehydrated, and such dehydrated materials used for various other purposes, for instance, as substitutes for drying oils, as plasticizers in the manufacture of resins, as ingredients entering into the compounding of insulating materials, etc. Generally speaking, the conventional procedure is to subject a quantity of castor oil to destructive distillation, approximately 250–310° C., and generally 250–285° C. until at least 5–15% of the original volume has been removed as a distillate. Sometimes the procedure is conducted primarily to recover the distillate, due to its high content of heptaldehyde. Generally speaking, the lower limits of the material distilled off are approximately 8–10%, and the upper limits, possibly 15–23%. In some instances, pyrolysis is conducted in presence of an added catalyst, which may permit the reaction, i. e., the degradation or destructive distillation, to take place at lower temperature; and sometimes vacuum is employed, or both vacuum and a catalyst. Such procedure of subjecting a ricinoleic acid body, and especially ricinoleic acid or castor oil, to a pyrolysis, is so well known that no further elaboration is required. However, for convenience, reference is made to the following patents, which clearly describe the procedure, and in some instances, point out at least some of the complicated chemical changes that take place:

U. S. Patent Nos. 1,240,565, Harris, Sept. 18, 1917; 1,749,463, Bertsch, March 4, 1930; 1,799,420, Holton, April 7, 1931; 1,886,538, Fanto, Nov. 3, 1932; 1,892,258, Ufer, Dec. 27, 1932; 2,156,737, Priester, May 2, 1939; 2,195,225, Priester, March 26, 1940; and British Patent No. 306,452, Scheiber, May 9, 1930.

As to a comparative evaluation of various dehydration catalysts for castor oil, see Masloboino-Zhirovanya Prom. 16, No. 5/6, 33–8 (1940).

The products which we prefer to use for reaction with ehylene oxide are blown dehydrated castor oils having substantially the following identifying characteristics within the ranges indicated:

| | |
|---|---|
| Acid number | 14.0 to 25.0 |
| Saponification number | 195 to 240 |
| Iodine number | 70 to 95 |
| Hydroxyl number | 63.0 to 80.0 |
| Reichert-Meissel number | Less than 5 |
| Acetyl number | 60 to 75 |
| Percent unsaponifiable matter | Generally less than 3 |
| Percent nitrogen | 0.0 |
| Percent $SO_2$ | 0.0 |
| Percent Ash | Trace |
| Specific gravity at 31° C | About 0.9574 |
| Refractive index at 31° C | About 1.4795 |
| Color | Straw or light amber |

A specific example of a very desirable oxidized dehydrated castor oil for use in the practice of this invention and which is available in the open market, has approximately the following specific characteristics:

| | |
|---|---|
| Acid number | 18.1 |
| Saponification number | 216.5 |
| Iodine number | 83 |
| Acetyl number | 68 |
| Hydroxyl number | 71.4 |
| Reichert-Meissel number | 2.0 |
| Percent unsaponifiable matter | Less than 2.5 |
| Percent nitrogen | 0.0 |
| Percent $SO_2$ | 0.0 |
| Percent ash | Trace |
| Specific gravity at 31° C | 0.9574 |
| Refractive index at 31° C | 1.4795 |

The above values or similar values are of assistance in indicating and characterizing a material of the kind herein contemplated. For instance, although the entire chemistry of the dehydration of castor oil is not known, yet obviously there must be a marked reduction in the acetyl or hydroxyl value, and simultaneously an increase in the iodine value. Also, such pyrolytic reaction tends to eliminate the low molal or volatile acids. On oxidation of such material, the acetyl value or hydroxyl value may stay constant or increase. But, in any event, the iodine value is reduced until it begins to approximate that of castor oil or ricinoleic acid prior to dehydration, or somewhat lower. The fact that the acetyl value or hydroxyl value does not increase proportionally with the drop in the iodine value, is of course due to either the formation of ether type compounds, or oxides which do not give a hydroxyl or acetyl value, or else, due to the formation of ester acids or similar reactions. It is generally desirable that the iodine number of the drastically-oxidized dehydrated castor oil be not less than 70, that the saponification value be within the range 195 to 200, and that the acetyl value be within the range of 60 to 75.

Having obtained drastically-oxidized dehydrated castor oil or other drastically-oxidized dehydrated ricinoleic acid compounds, the next step is oxyalkylation in the same manner as previously described. Our preferred oxyalkylating agent is one having not over four carbon atoms per mole, i. e., we prefer to use ethylene oxide, propylene oxide, butylene oxide, or glycidol. Due to its availability and low cost, together with its extreme reactivity and low molecular weight, we prefer to use ethylene oxide. For convenience, the following examples refer to ethylene oxide as the oxyalkylating agent, but obviously, other reactants may be employed:

Example 1

180 lbs. of a drastically-oxidized dehydrated castor oil of the kind described by the last tabular specification, immediately preceding, is mixed with 1 lb. of sodium stearate and then subjected to reaction in a suitable autoclave with 46 lbs. of ethylene oxide. The temperature employed is approximately 170° C., and the time approximately 15 hours. During this period the gauge pressure drop was from a maximum of 320 lbs. to 0. The product so obtained has somewhat marked hydrophile properties, that is, shows a tendency towards self-emulsification.

Example 2

The same procedure is followed as in the preceding example, except that after the initial drop to zero, a second batch, to wit, 46 lbs. more of ethylene oxide, were added, and reaction conducted for 10 hours, until there was a drop from 300 lbs. gauge pressure to zero. The product so obtained is a self-emulsifying oil and represents a molar ratio of 1 to 12.

Example 3

136 lbs. of material obtained in the manner described in Example 2, preceding, is treated with 46 lbs. of ethylene oxide at a temperature of 170° C. for 8 hours. During this reaction period the temperature reached a maximum of 420 lbs. and dropped to zero. This represents a ratio of 1 to 24. The product so obtained shows solubility in water, with some persistent cloudiness, although markedly more soluble than the preceding example.

Example 4

A batch of material, as described in the preceding example, was prepared and treated with an additional 136 lbs. of ethylene oxide. Substantially the same temperature, time and pressure conditions were employed as in the preceding example. This product represented a molar ratio of 1 to 48. It was readily soluble in water to give a clear solution without any disturbance of turbidity. The product is distinctly more water-soluble than the preceding example.

Attention is directed to a fact which has already been emphasized to a greater or lesser degree, and that is, that the chemistry involved in the dehydration of castor oil or a similar ricinoleic acid compound, cannot be clearly and completely described. This is also true in regard to the second step, i. e., the drastic oxidation of such dehydrated castor oil or equivalent compound. There is no adequate description of the chemical changes which take place during such oxidation procedure. Finally, since there is no suitable way of describing drastically-oxidized dehydrated castor oil, except in terms of its method of manufacture, it is equally obvious that the same procedure must be relied upon to describe oxyalkylated derivatives. Furthermore, it must be remembered that the type of reactions which take place are more complicated than those involved when one oxyalkylates a simple glyceride, such as triolein.

Materials of the kind herein contemplated may find uses as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles such as sewage, coal washing waste water, and various trade wastes and the like; as germicides, insecticides, emulsifiers for cosmetics, spray oils, water-repellent textile finish, etc. These uses are by no means exhaustive.

However, the most important phase of the present invention, as far as industrial application goes, is concerned with the use of the materials previously described as demulsifiers for water-in-oil emulsions, and more specifically, emulsions of water or brine in crude petroleum.

We have found that the particular chemical compounds or reagents herein employed as demulsifiers may also be used for other purposes, for instance, as a break inducer in doctor treatment of the kind intended to sweeten gasoline.

See U. S. Patent No. 2,157,223, dated May 9, 1939, to Sutton.

Chemical compounds of the kind herein described are also of value as surface tension depressants in the acidization of calcareous oil-bearing strata by means of strong mineral acid, such as hydrochloric acid. Similarly, some members are effective as surface tension depressants, or wetting agents, in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to DeGroote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to DeGroote and Keiser.

We have found that the most valuable products by far are obtained by use of the oxyalkylating agent, for instance, ethylene oxide, within the ratio of 12 to 30 moles of ethylene oxide per mole of original glyceride, i. e., castor oil, or 4 to 10 moles of ethylene oxide per mole of ricinoleic acid originally employed as the raw material.

Attention is directed to the fact that in Examples 2, 3 and 4, preceding, the molecular weight of the drastically-oxidized dehydrated ricinoleic acid compound was taken arbitrarily to be 1,000, in figuring the molar ratios of oil to ethylene oxide of 1–12, 1–24 and 1–48, respectively.

Other uses for the herein described chemical compounds or products include application as plasticizers, in plastics, synthetic resins, etc., and particularly in the acetate type, i. e., the cellulose acetate, vinyl acetate, and similar types.

Having thus described our invention, what we claim as new and desire to secure by Letters Patent is:

1. A new composition of matter, consisting of an oxyalkylated drastically-oxidized dehydrated ricinoleic acid compound.

2. A new composition of matter, consisting of an oxyalkylated drastically-oxidized dehydrated ricinoleic acid compound, in which the radicals introduced by oxyalkylation were selected from the class consisting of ethylene oxide radicals, butylene oxide radicals, propylene oxide radicals, and glycidol radicals.

3. A new composition of matter, consisting of an oxyethylated drastically-oxidized dehydrated ricinoleic acid compound.

4. In a method of preparing a new composition of matter of the kind described in claim 1, preceding, the collective and successive steps of: (a) dehydrating castor oil until the distillate is at least 8% and not more than 23% by volume of the original castor oil; (b) drastically-oxidizing said dehydrated castor oil until the iodine value is within the range of 70–95; and (c) oxyethylating said drastically-oxidized dehydrated castor oil at approximately 170° until at least 6 moles and not more than 48 moles of ethylene oxide have been absorbed per mole of original castor oil.

5. A new composition of matter, consisting of an oxyethylated, drastically-oxidized, dehydrated, ricinoleic acid compound; said compound being obtained by oxidizing dehydrated castor oil; said dehydrated castor oil, in turn, being obtained by pyrolytically distilling castor oil so that the distillate obtained is equal to at least 8% and not more than 23%, by volume, of the original castor oil.

6. The new composition of claim 5, wherein the drastically-oxidized product, prior to oxyethylation, has an iodine number of not less than 70, a saponification value within the range of 195–240 and an acetyl value within the range of 60–75.

7. The new composition of claim 5, wherein the oxidized product, prior to oxyethylation, has the following characteristics:

| | |
|---|---|
| Acid number | 18.1 |
| Saponification number | 216.5 |
| Iodine number | 83 |
| Acetyl number | 68 |
| Hydroxyl number | 71.4 |
| Reichert-Meissel number | 2.0 |
| Percent unsaponifiable matter | Less than 2.5 |
| Percent nitrogen | 0.0 |
| Percent $SO_2$ | 0.0 |
| Percent ash | Trace |
| Specific gravity at 31° C | 0.9574 |
| Refractive index at 31° C | 1.4795 |

8. The new composition of claim 5, wherein the oxidized product, prior to oxyethylation, has the following characteristics:

| | |
|---|---|
| Acid number | 14 to 25 |
| Saponification number | 195 to 240 |
| Iodine number | 70 to 95 |
| Hydroxyl number | 63 to 80 |
| Reichert-Meissel number | Less than 5 |
| Acetyl number | 60 to 75 |
| Specific gravity at 31° C | About 0.9575 |
| Refractive index at 31° C | About 1.4795 |

MELVIN DE GROOTE.
BERNHARD KEISER.